T. A. EDISON.
ACOUSTIC TELEGRAPH.
No. 182,996.　　　　　　　　Patented Oct. 10, 1876.
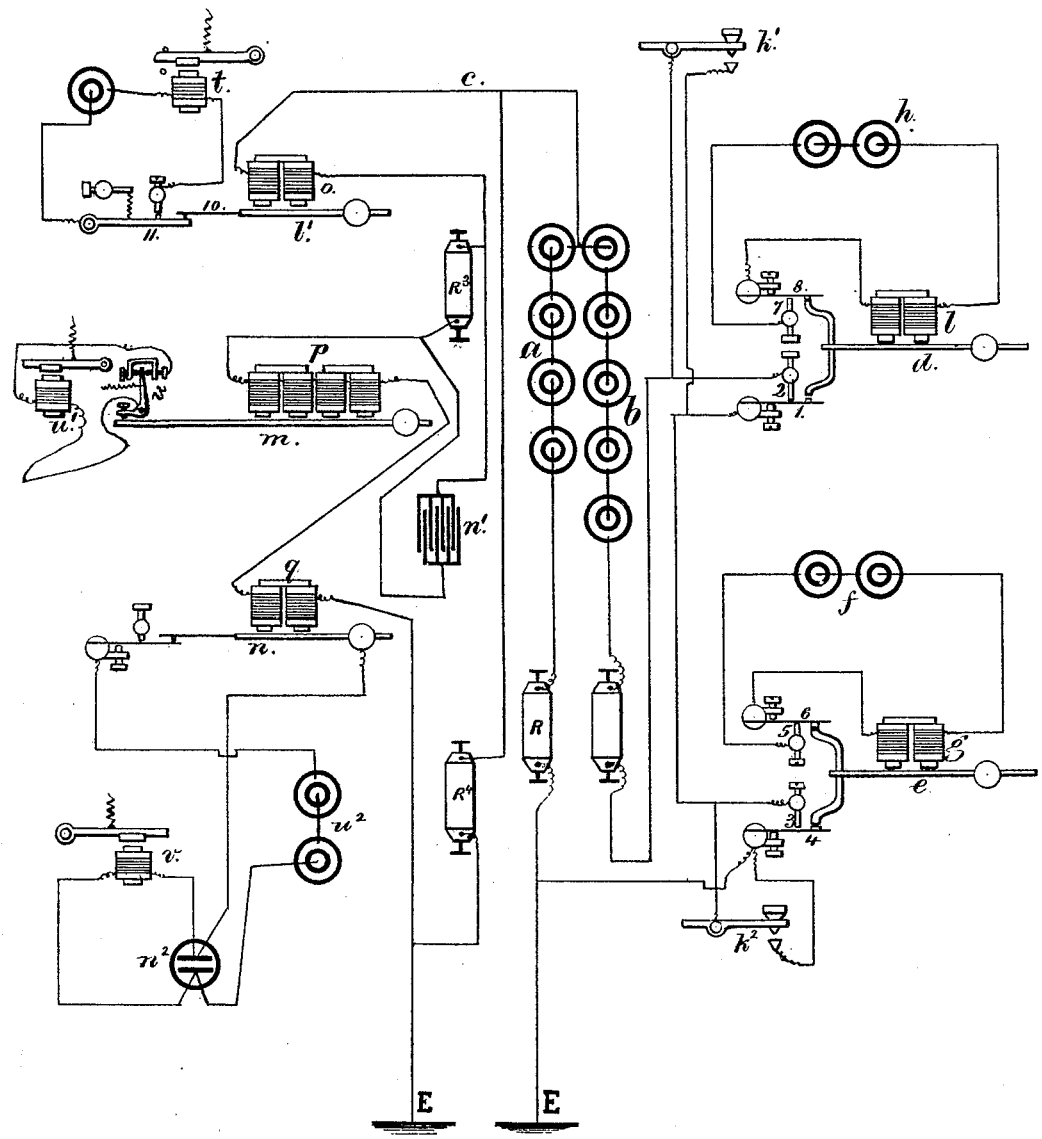

UNITED STATES PATENT OFFICE.

THOMAS A. EDISON, OF MENLO PARK, NEW JERSEY, ASSIGNOR TO THE WESTERN UNION TELEGRAPH COMPANY.

IMPROVEMENT IN ACOUSTIC TELEGRAPHS.

Specification forming part of Letters Patent No. 182,996, dated October 10, 1876; application filed May 16, 1876.

*To all whom it may concern:*

Be it known that I, THOMAS A. EDISON, of Menlo Park, in the county of Middlesex and State of New Jersey, have invented an Improvement in Acoustic Telegraphs, of which the following is a specification:

Two batteries are connected to the line and to the earth, and the earth-connection from one is direct, and in the earth-connection from the other are the tremolo circuit-closers of the reeds, and also finger-keys. When one tremolo is short-circuited by its key, the other tremolo only is operative in sending pulsations over the line, and the distant reed responds to the same. When both are operative in sending pulsations, both receiving-reeds at the other end respond. One battery is slightly stronger than the other, and when the short circuit of the stronger battery is broken the other battery is operative upon the line, and when the other circuit is closed to the earth the weaker battery is overpowered and a weak pulsation sent upon the line, clearing it of its static charge. In this manner the pulsations from the tremolo circuit-closers can be very rapid, and, the batteries being connected with opposite poles to the line, the static effects are neutralized by the transmission of a slight contrary current, due to the excess of one battery over the other.

The battery is made of the minor element $a$, and major element $b$, with zinc of $a$, and copper of $b$, to line. The battery $a$ is connected to earth E through rheostat R, and from the battery $b$ to earth there is a circuit-wire, in which are the tremolo circuit-closers 1 2 and 3 4. The key $k^1$ short-circuits the tremolo 1 2, and the key $k^2$ short-circuits 3 4. The reeds or other vibrating bodies $d\ e$ are operated and kept in vibration by the local circuits and electro-magnets, the battery $h$, magnet $l$, and circuit-closers 7 8 acting with the reed $d$, and the battery $f$, magnet $g$, and circuit-closers 5 and 6 acting with the reed $e$.

The operations of the transmitting portion of the instrument will be apparent. The reeds $d$ and $e$ being constantly vibrated, and vibrating at different rates of speed, as in other acoustic telegraphs, the circuits at 1 2 and 3 4 will be opened and closed in harmony with the respective reeds, and the pulsations will pass over the line from the battery $a$ whenever the circuit of battery $b$ is broken, the power of battery $a$ being free to act and pass over the line; but when the circuit of $b$ is closed an excess of current passes from the battery $b$ into the line, to neutralize static effect and clear the line. When either key $k^1$ or $k^2$ is closed, the corresponding tremolo circuit-closer becomes inoperative on the line because of the continuous metallic connection short-circuiting the same. The other tremolo circuit-closer, however, may be fully operative. By this means the cessation of vibration of the receiving-reed, or its equivalent, corresponds with the circuit-closing of the finger-key at the sending station, and the vibration denotes a state of rest of the finger-key. If the normal condition of the finger-key was a closed circuit through it, then the signal would result from the vibration of the reed at the receiving-station corresponding to the opening of the finger-key circuit.

At the receiving-station the line $c$ divides, and one branch passes by the rheostat $R^4$ to earth. The other passes through electro-magnets $o\ p\ q$ to earth, and adjacent to these magnets are the vibrating reed-armatures toned to respond to the reeds of similar notes at the sending-station. There is a rheostat, $R^3$, that is shunted by the condenser $n'$, the object being to avail of the discharge of the condenser to neutralize the static charge of the line. The rheostats are to be of proper resistance to effect this object. It is preferable to employ four spools, or a double electro-magnet at $p$, to operate upon the reed $m$, which is advantageous upon reeds of a high note, as they require more power than those of a low note to vibrate them. The poles of the electro-magnets are preferably arranged so that the two north poles come next each other, or the reverse, so that the inductive effects upon the reed will be neutralized, and tendency to stick avoided. The reed $l'$ is prolonged in the form of a very light strip of metal, 10, that is, by preference, corrugated, to render it stiff. By this means a greater range of motion is obtained to operate the circuit-closer 11 of the local circuit and sounder $t$.

The reed $m$ operates at the end against the short end of a lever, $u$, which may be a bent lever, so that the long end has greater range of motion and operates more reliably as a circuit-closer for the sounder $u^1$ in a local circuit than the reed itself. This lever $u$ is positioned so that it is only operated by the reed $m$, when in full vibration; hence the local circuit-closer will not act when the magnet $p$ ceases to operate upon the reed. The reed $n$ opens and closes a local circuit passing through itself from the local battery $u^2$, and there is a secondary battery or acidulated cup, $n^2$, in the same circuit. The rapid vibrations of the reed $n$ induce a constant magnetism in the sounder $v$ in consequence of the secondary battery prolonging the current and preventing magnet $v$ discharging until the reed $n$ pauses in its vibration; hence the sounder or receiving-instrument $v$ will be demagnetized and respond to the closing of the distant finger-key.

If the sending-instruments are placed at an intermediate station, the batteries $a\ b$ may be in branches or derived circuits in the main line.

I claim as my invention—

1. In an acoustic telegraph, two sections, $a\ b$, of the battery, in derived circuits from the main line, in combination with resistances and a tremolo circuit-closer operated by the reed, or its equivalent, and placed in one of the battery-circuits, substantially as set forth.

2. In an acoustic telegraph, a battery, in two sections, connected to the line, and to derived circuits, in combination with tremolo circuit-closers, reeds operated by magnets, and keys to short-circuit the circuit-closers, substantially as set forth.

3. The combination, with an acoustic telegraphic reed, of an extension that is lighter than the reed, to operate circuit-closing devices, substantially as set forth.

4. The combination, with an acoustic receiving-instrument, of a derived circuit from the main line containing a condenser, and a resistance in the main line, substantially as set forth.

5. The combination, with a vibrating reed in an acoustic telegraph, of four electro-magnet spools placed in the main line, substantially as set forth.

6. The combination, with the vibrating reed $m$, of the lever $u$, and local circuit, arranged so that the lever $u$ is only acted upon by the reed $m$ when in full vibration, substantially as set forth.

7. The combination, with an acoustic telegraph, of a local circuit, a secondary battery, a receiving-instrument or sounder, and a circuit-closer operated by the reed, substantially as set forth.

Signed by me this 9th day of May, A. D. 1876.

THOS. A. EDISON.

Witnesses:
  J. D. RUSS,
  CHAS. BATCHELOR.